INVENTORS
HENRY A. JURGENS
DONALD K. REX
DANIEL G. O'CONNOR

BY
AGENT

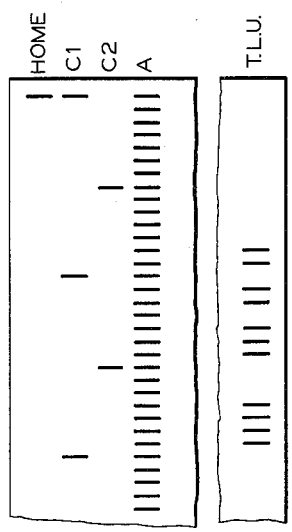

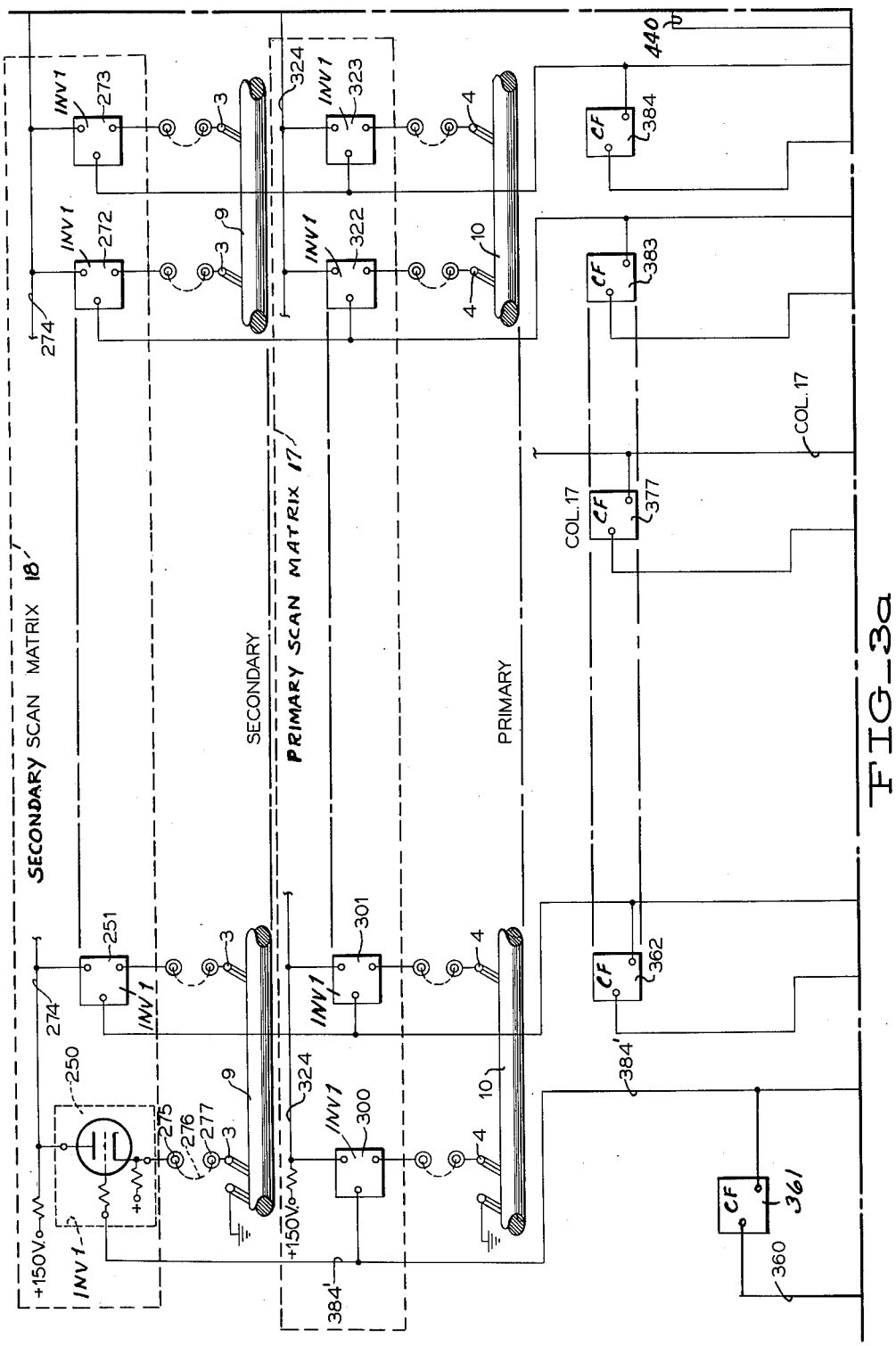

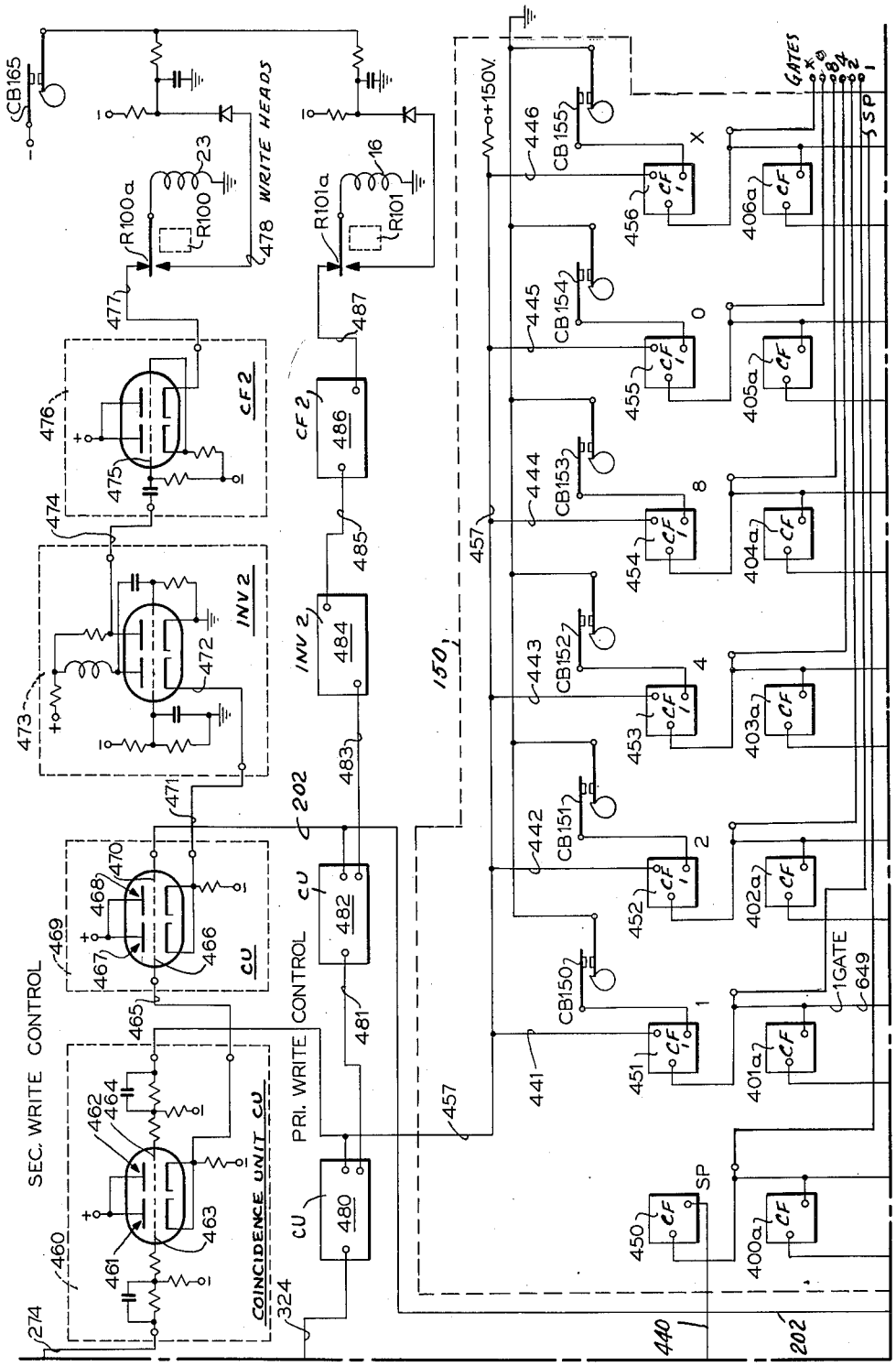

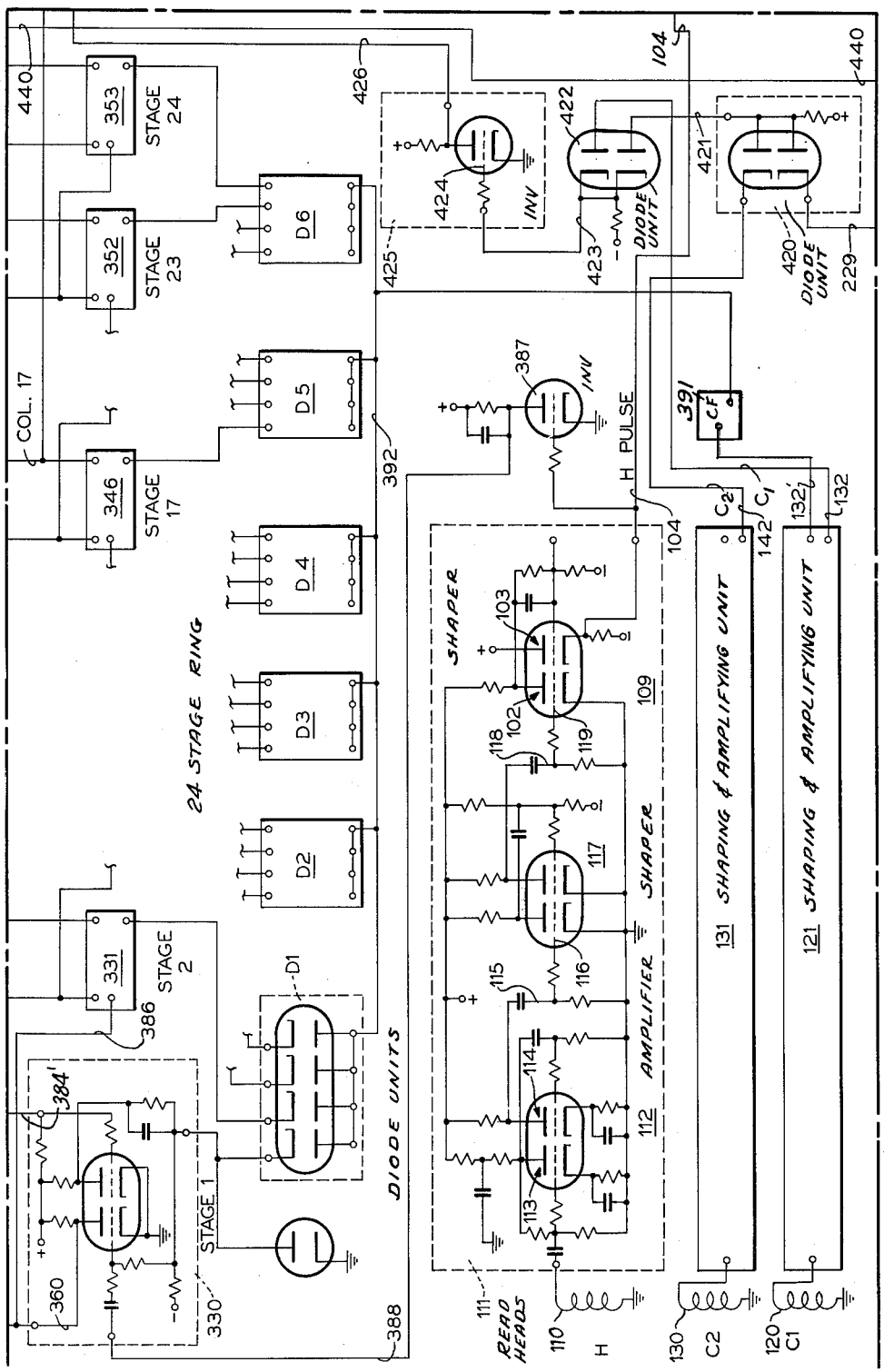

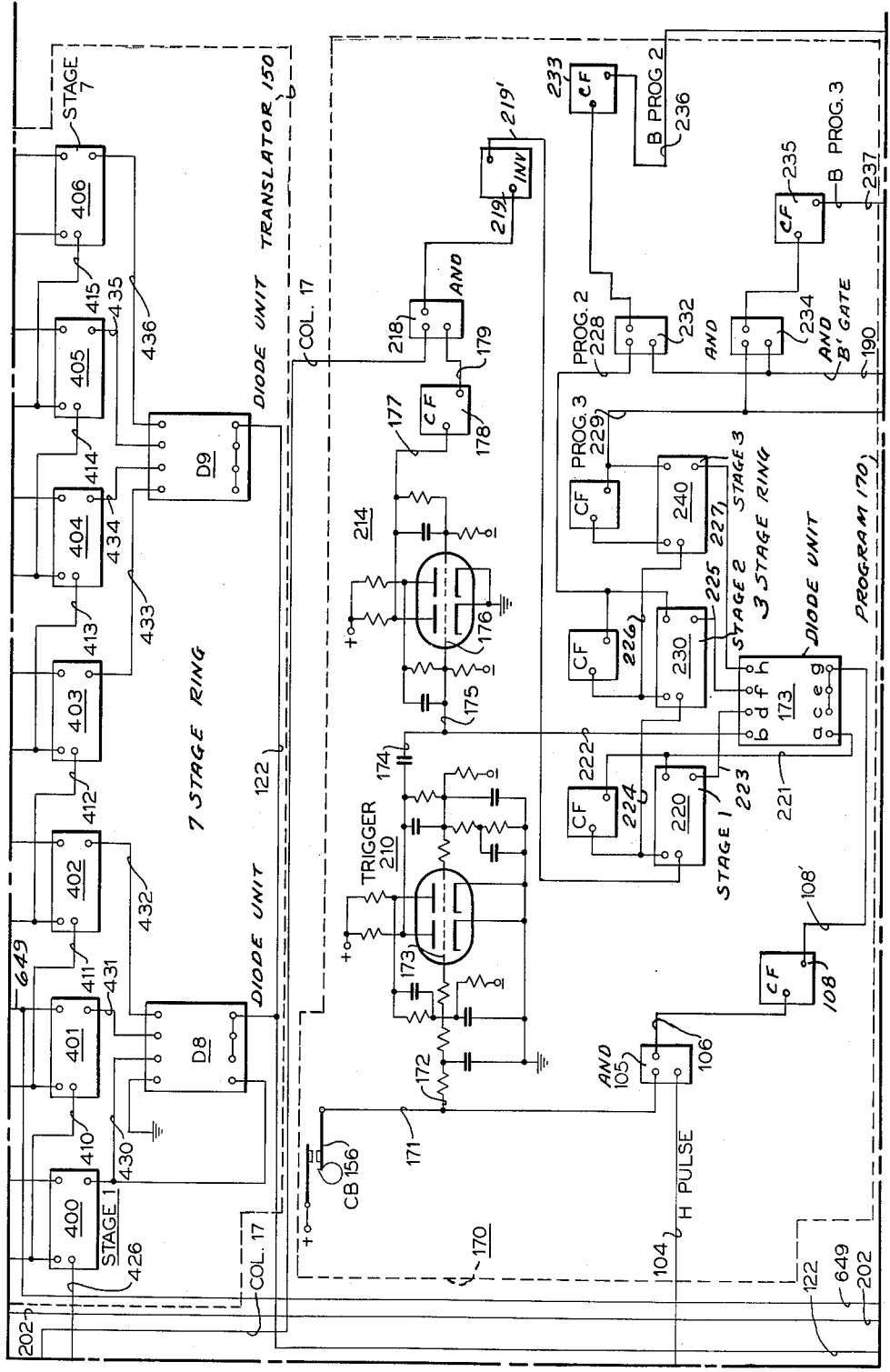

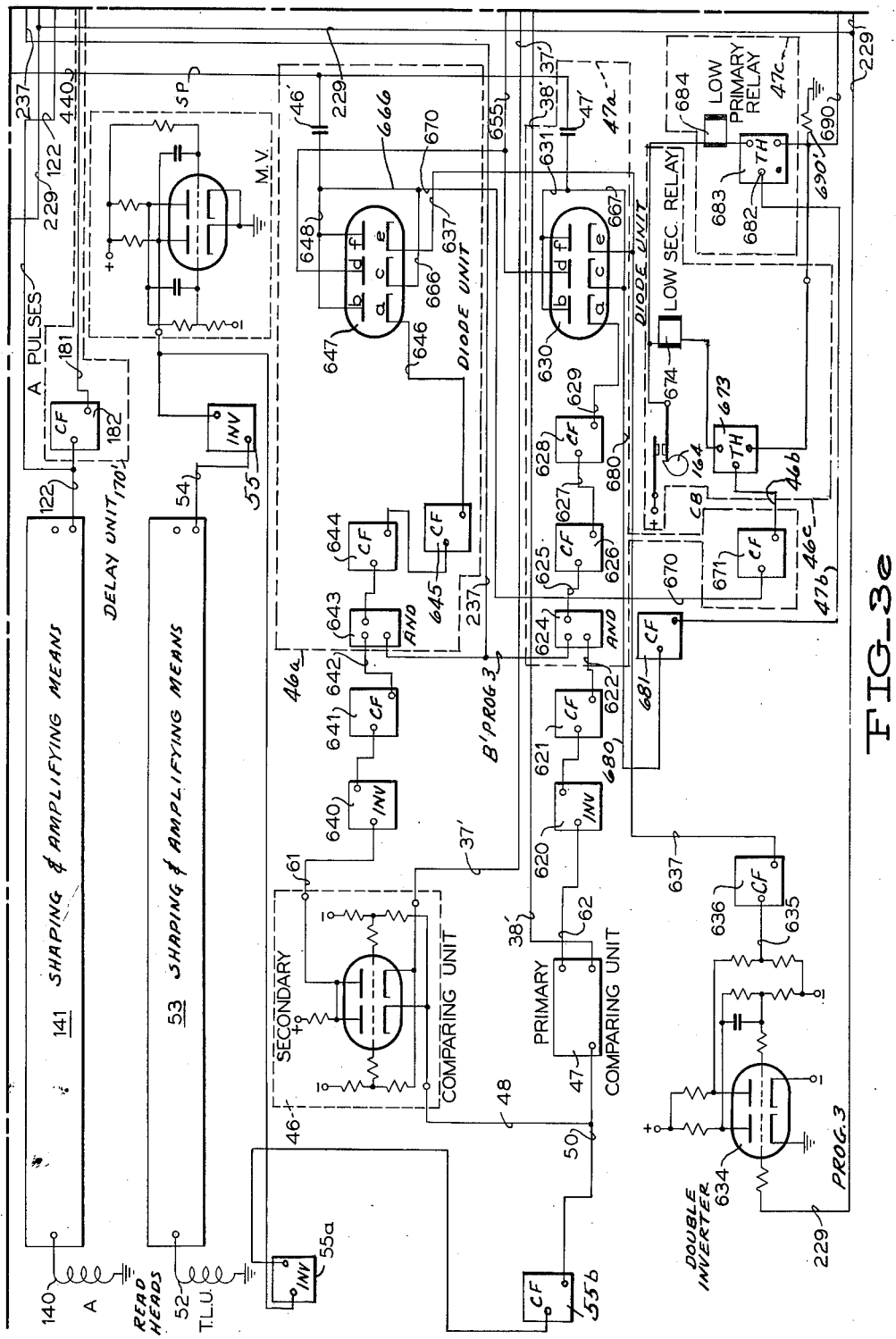

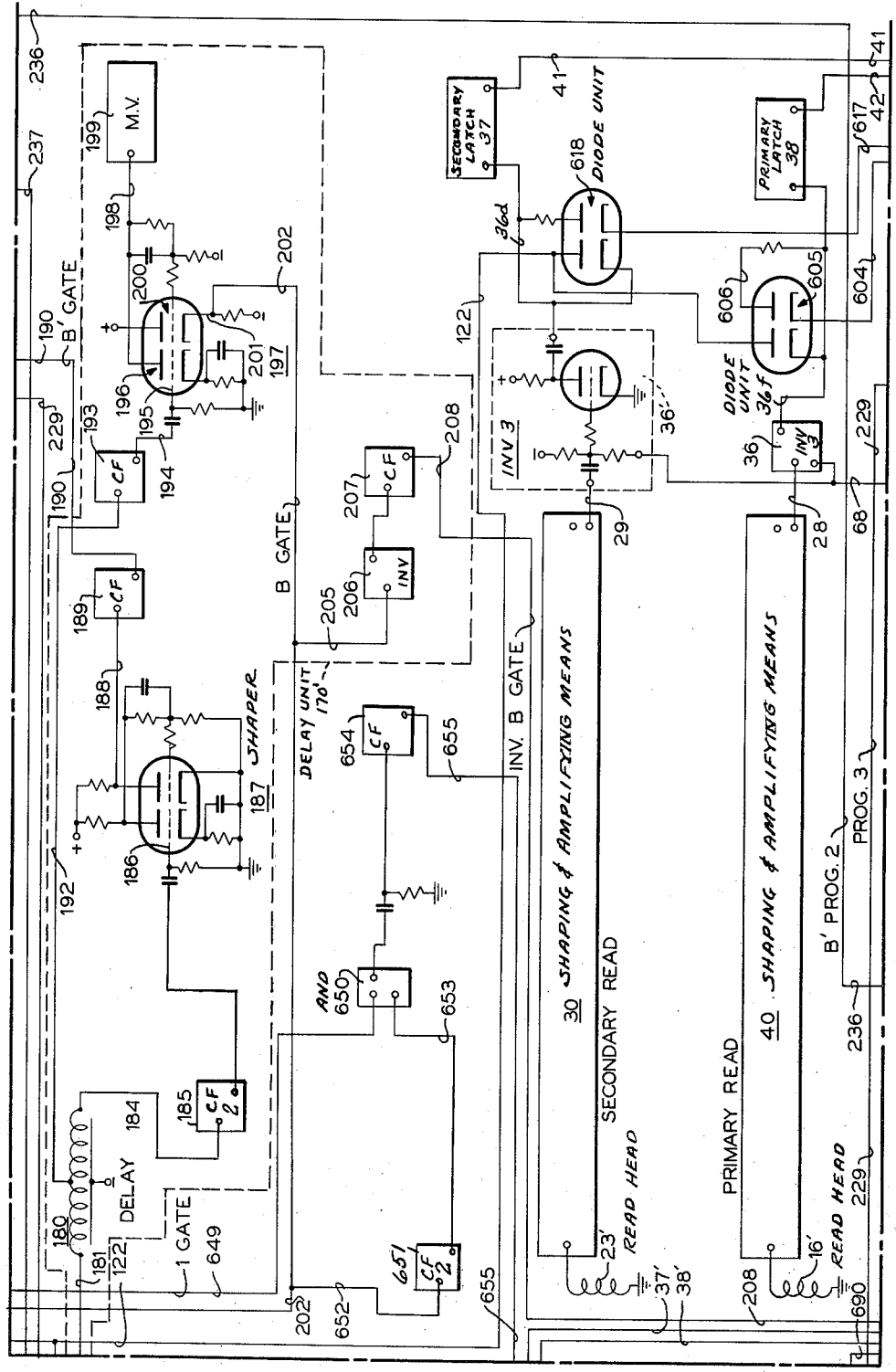

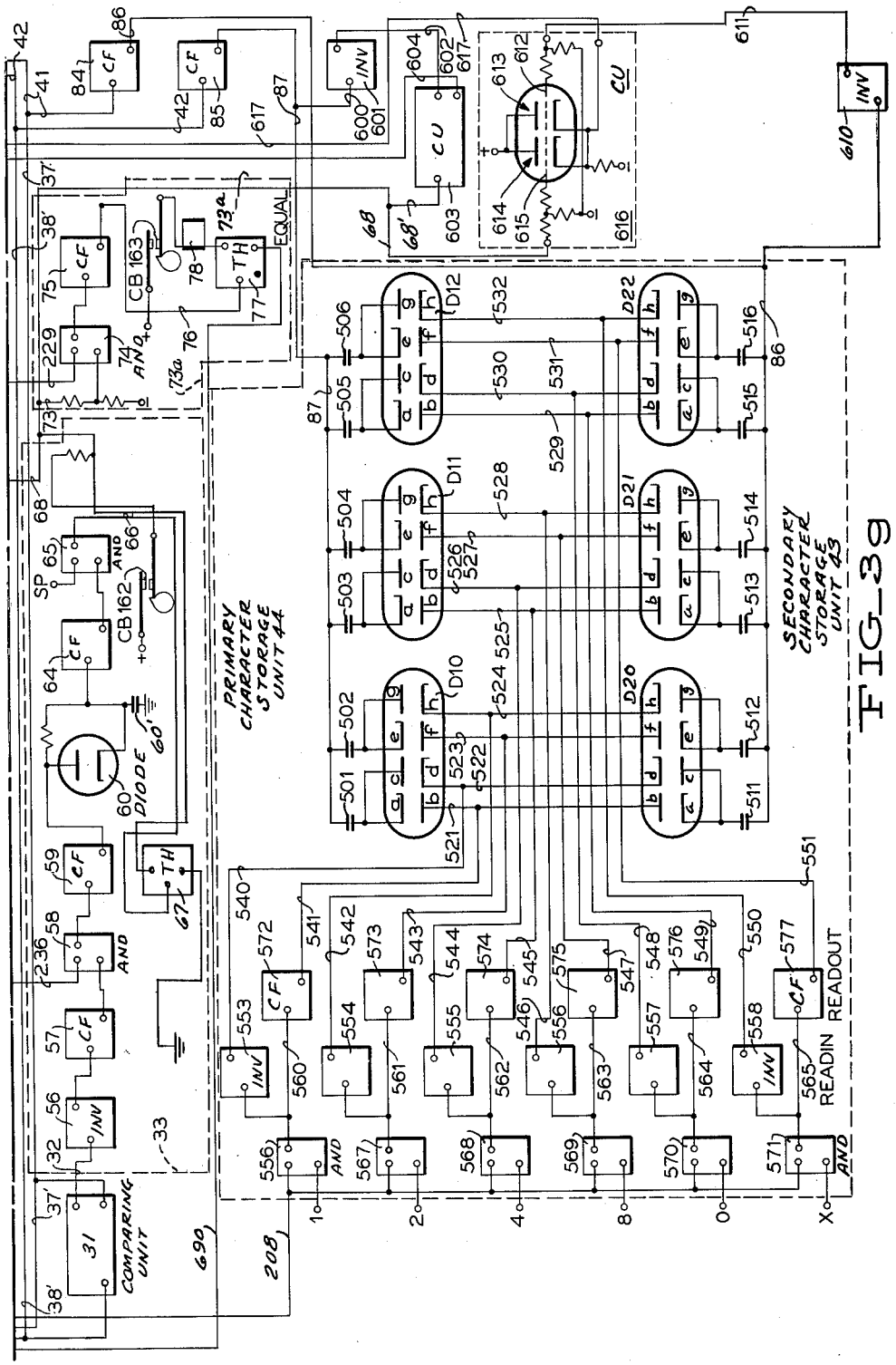

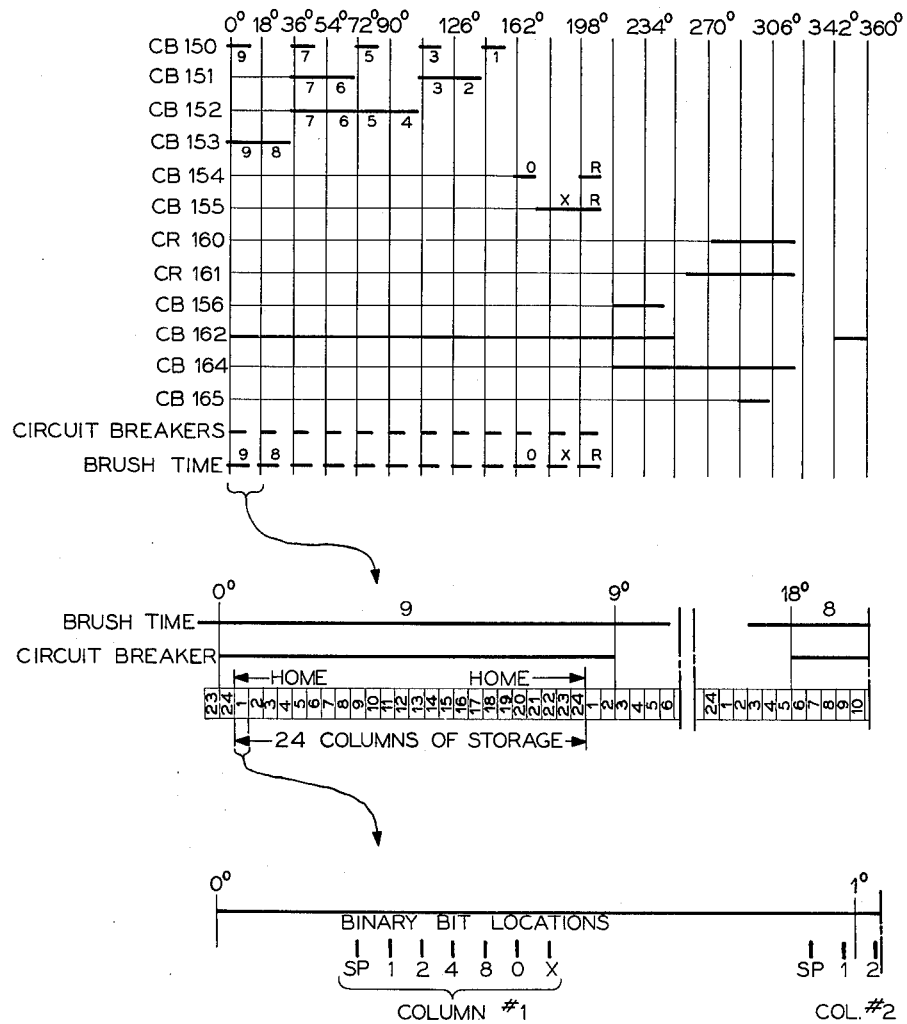
FIG_6
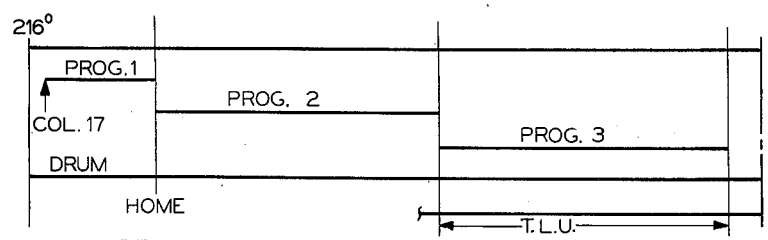
FIG_7

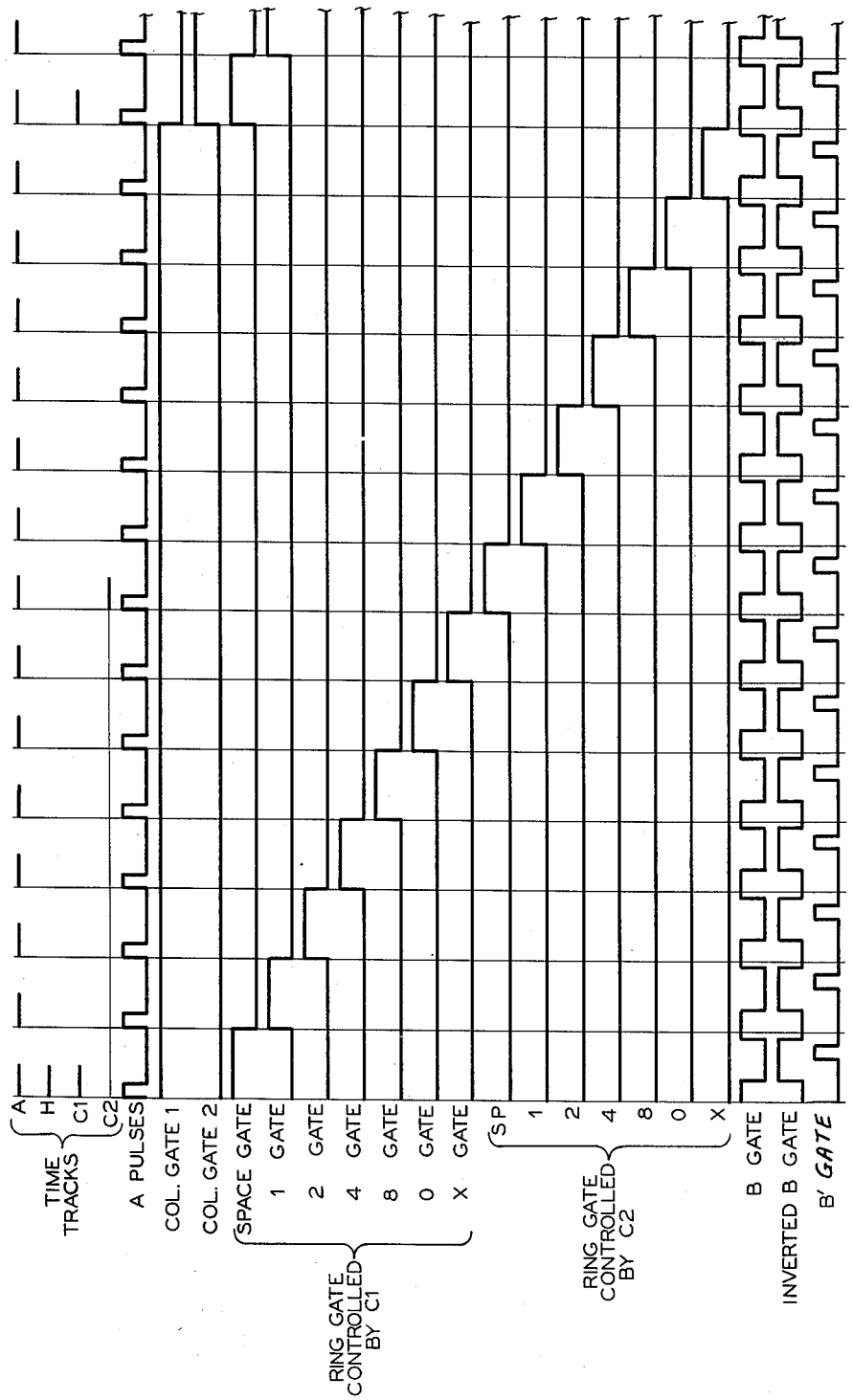
FIG_8

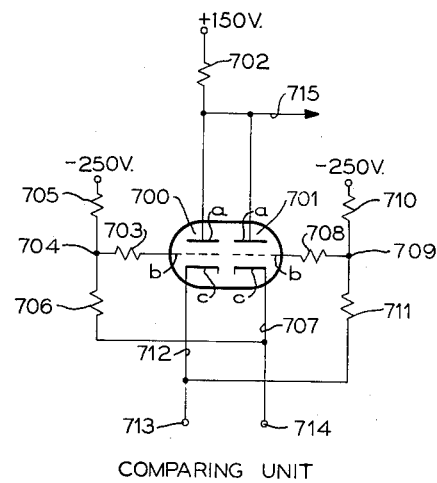
COMPARING UNIT
FIG_9

United States Patent Office 3,034,644
Patented May 15, 1962

3,034,644
COLLATOR EMPLOYING TABLE
LOOKUP COMPARISON
Henry A. Jurgens, Briarcliff Manor, and Donald K. Rex, Binghamton, N.Y., and Daniel G. O'Connor, Sunnyvale, Calif., assignors to International Business Machines Corporation, New York, N.Y., a corporation of New York
Filed July 18, 1958, Ser. No. 749,520
9 Claims. (Cl. 209—110)

The invention is concerned with record controlled machines of the type referred to as collators.

Generally speaking, machines for collating are old in the art; however, in one way or another, these machines are limited to specific types of operations owing to the fact that the data recorded on the records processed through these machines may not be readily collatable and for this reason, only limited portions of a collating operation can be done in any single run. In some instances, the collating machines are especially provided with expensive and complex apparatus to perform the collating operation in a single run. However, in these instances, the cost is prohibitive and the apparatus is slow in operation and not too reliable.

The principal object of the invention resides in the provision of novel collating means that will collate records regardless of the complex nature of the coded data recorded on such records Another object resides in the provision of novel collating means which is economical to manufacture and provides speeds of operation that are considerably greater than those of the prior art.

Yet another object resides in the provision of novel collating means including a magnetic drum, or comparable magnetic medium, on which a table of character information comprising the coded characters of a system may be recorded in any desired sequence, whereby coded information, regardless of its complex coded construction, can be collated with ease and at high speeds of operation.

Still another object resides in novel comparing means for comparing signal representations of data.

A novel specific object resides in the provision of novel electronic comparing means for comparing signal representations of data at high speeds of operation.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 2 is a block diagram showing how FIGS. 3a through 3g are arranged to form a detailed wiring diagram of the invention.

FIG. 4 is a chart showing a full complement of alphabetic, numerical and special characters in Hollerith code form and in binary code form.

FIG. 5 shows a detail portion of the surface of the drum on which surface is recorded discrete areas for generating the various timing signals used throughout the invention.

FIG. 6 is a time chart of the machine showing the principal timings and those related to the drum.

FIG. 7 is a time chart of the program controls.

FIG. 8 is a detail time chart of the drum timing tracks and the various gate signals used throughout the circuitry.

FIG. 9 is a detail circuit drawing of a comparing unit used in the invention.

Figure 1:
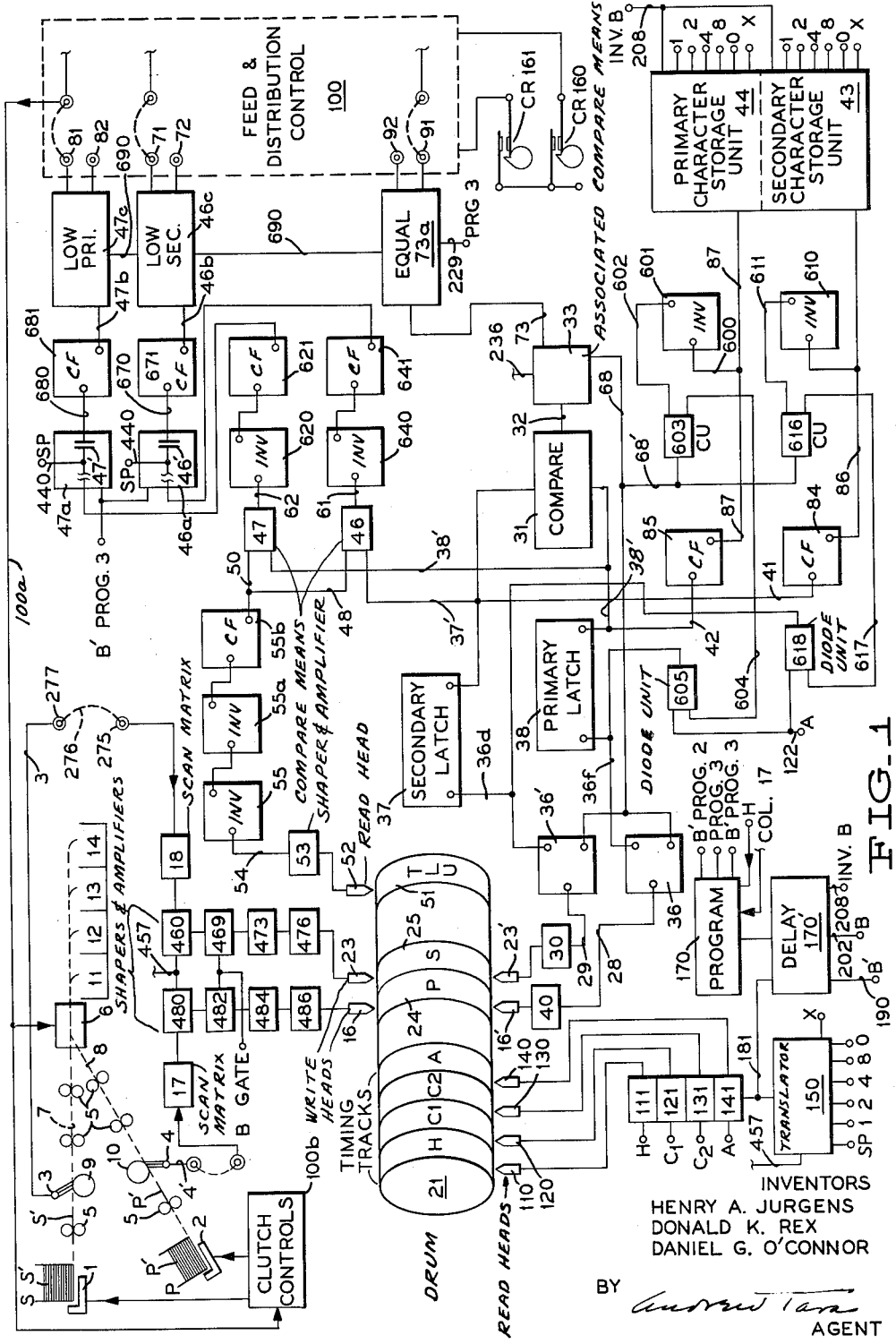
FIG. 1 is a schematic drawing showing the principal units constituting the invention.

For the purpose of illustration, the present invention is embodied in a collator of the type shown and described in Patent No. 2,379,828 issued to D. W. Rubidge et al. on July 30, 1945, for Record Control Machine and assigned to the common assignee. This collator is provided with two separate card feeding and sensing mechanisms designated primary and secondary, each having a record card hopper into which are placed the perforated record cards to be collated.

In its broadest aspect, the invention embodies a magnetic drum bearing a table of coded characters arranged in a desired sequence. The two groups of data bearing record cards to be merged are fed through the collator, one group designated primary being fed through and sensed by the primary feeding and sensing mechanism, and the other group designated secondary being fed through and sensed by the secondary feeding and sensing mechanism.

A first comparison is effected between data in a record card of the primary group and data in a record card of the secondary group. If the comparison yields an equal, the distributing instrumentalities of the collator effect the merging of the two record cards and thus cause the next pair of record cards to be fed and compared to determine if they can be merged in the same way. If during this operation the comparison yields an unequal, the record card data determined to be unequal is then compared with the data in the table whereby a final determination is made as to which of the two unequal records is high or low with respect to the other record.

In order to describe generally the operation of the means constituting the present invention, reference is invited to FIG. 1 of the instant specification where, in the left-hand corner thereof, there is shown schematically the feed mechanism. Here the secondary and primary hoppers are identified, respectively, as S and P and the associated picker knives are identified as 1 and 2 and the record cards are appropriately identified as S' and P'. Each unit has at least one sensing station which includes a line of 80 sensing brushes for sensing the perforations in the records fed along appropriate channels by means including feed rollers 5. Only one sensing brush in each unit is shown, for example, that shown in the secondary is identified as 3 while that shown in the primary is identified as 4. The sensing brushes terminate at appropriate sockets, for example, sensing brush 3 terminates with socket 277, located in a plugboard, not shown, a plugwire 276 connects socket 277 to socket 275 connected to a scan matrix 18. Similar connections are made to a scan matrix 17 from the primary sensing brushes 4. Both of the card paths or channels extending between the respective hoppers S and P and the distribution means 6 are shown in dotted lines and are identified as 7 and 8. The record card receiving pockets are identified as 11, 12, 13 and 14. The record cards are distributed into these pockets under control of the control data recorded on the cards which control data is analyzed to control the distribution mechanism 6 in a manner fully explained in the afore-mentioned patent.

The data sensed from the record cards S' and P' are conveyed to matrices 17 and 18 which, in conjunction with translating means, convert the scanned Hollerith coded data to another code form in which the bit representations have values designated 1, 2, 4, 8, 0, X. All characters, numerical, alphabetical and special are assigned bit representations according to the chart of FIG. 4. The coded data signals from the primary scan matrix 17 is passed on to a primary recording head means 16 by way of a series of pulse shapers and amplifiers referenced 480, 482, 484 and 486. Similar means 460, 469, 473 and 476 provide shaped and amplified secondary coded data signals from the secondary scan matrix 18 to secondary recording head means 23. Energization of the recording means 16 and 23 causes recording of the scanned primary and secondary coded data signals on drum tracks designated P and S of a rotating magnetic drum 21.

The data recorded on the drum tracks P and S are read therefrom by read heads 16' and 23' from which the data signals are passed on to comparing unit 31 for the first comparison. From the read head 16', the primary coded data is passed on through shaping and amplifying means 40, line 28, inverter 36, line 36f to primary latch 38. From the latter gated output, signals are issued through line 38' to compare unit 31. From read head 23', secondary recorded data is passed on through shaping and amplifying means 30, line 29, inverter 36', line 36d to secondary latch 37. From the latter gated output, signals are issued through line 37' to the compare unit 31. If the comparison yields an equal, the related record cards are merged. On the other hand, if the comparison yields an unequal, a second comparison is made by comparing means 46, 47. As the signal representations of each character, primary and secondary, are fed to the compare unit 31, they are also fed to character storage units 43 and 44 in the following way. Primary character gated signals on the line 38' are also issued through line 42, cathode follower 85, line 87 to primary character storage unit 44. Secondary character gated signals on the line 37' are also issued through line 41, cathode follower 84, line 86 to secondary character storage unit 43. These units 43, 44 are effective following an unequal comparison to regenerate the characters stored therein. The regenerated signals representing each primary and secondary stored character are issued from the respective units 43, 44 to comparing means 46, 47 wherein final comparing determinations are made as to whether one of the stored characters is high or low with respect to the other stored character. The path for transmitting regenerated secondary character signals from secondary character storage unit 43 to compare means 46 is as follows. From line 86, the path follows through inverter 610, line 611, coincidence unit 616 gated by an unequal signal from line 68, line 617, diode unit 618, line 36d to and through the latch 37, line 37' to compare means 46 gated with table lookup character signals. The path for transmitting regenerated primary character signals from primary character storage unit 44 to compare means 47 is as follows. From line 87, the path follows through line 600, inverter 601, line 602, coincidence unit 603 gated by an unequal signal from line 68, line 604, diode unit 605, latch 38, line 38' to compare means 47. As the regenerated character signals are transmitted to the compare means 46, 47, table lookup character signals are simultaneously issued from the drum 21 to these units whereby the final comparisons are determined. The table lookup character signals are issued from the table on the drum by way of read head 52, through signal shaping and amplifying means 53, line 54, inverters 55 and 55a, cathode follower 55b, line 50, to both units 46 and 47. FIGS. 4 and 5 show the bit structure of the numeric, alphabetic and special characters employed in the table, against which the regenerated characters are compared serially bit by bit. The comparison against the table characters continues until an equal condition is encountered between one or the other of the regenerated characters and a table character. The regenerated character causing the equal condition is designated high or low with respect to the other regenerated character depending on whether the table characters are arranged in ascending or descending sequence. On the assumption that the sequence is ascending, a table value 3 compared with a primary value 3 and a secondary value 3 yields a low primary output. Conversely, a comparison of the same values with a table, in which the sequence is descending, yields a low secondary output.

In the embodiment shown the final signal determination is developed in comparing units 46', and 47', connected to comparing units 46 and 47 by way of the means shown. The final signal determinations pass through output lines 46b and 47b connected to a low secondary means 46c and a low primary means 47c, respectively. From the former the low secondary signal passes through plug socket 71 while the low primary signal passes through plug socket 81.

In the absence of an unequal comparison, signals will be issued among which an equal signal will be generated and passed along line 73 to means 73a and made available at plugboard sockets 91, 92. The sockets 71, 81, 91, respectively, correspond to the sockets designated PS39, PS37 and PS38, shown in the plugboard diagrams in the afore-mentioned Rubidge et al. patent. From these latter sockets are issued, respectively, a low secondary signal, a low primary signal and an equal signal. These signals are employed in the manner explained in the afore-mentioned patent and the Page patent, No. 2,359,670 to control operations of the primary and secondary feeds, and the distribution means to direct the records to the appropriate record receiving pockets.

The box referenced 100 in FIG. 1 of the instant invention represents schematically the various controls contained in the afore-mentioned patents to effect desired collating, selecting and merging operations. The various control signals are passed along appropriate lines, here designated as line 100a, which control the distribution means 6 and clutch controls 100b.

The drum 21 is further provided with appropriate timing tracks for generating a home pulse H, gate signals $C_1$ and $C_2$ and A pulses. These tracks are scanned by associated heads 110, 120, 130 and 140, respectively. The means for generating timing signals in accordance with these tracks are contained in boxes 111, 121, 131 and 141, a description of which will be provided hereinafter.

In addition, there is a box referenced as 150 for generating gate signals referenced as SP, 1, 2, 4, 8, 0 and X. These signal gates and those described are shown in a time chart of FIG. 8.

A three-step program means 170 is employed to coordinate the activities of the means involved in the invention, by supplying program gates, the significant ones being B' Prog. 2, Prog. 3 and B' Prog 3. These program gates are combined with delayed A pulses in a delay unit 170' which issues the following gates: B, B' and INV. B respectively on lines 202, 190 and 208.

Timing Tracks and Signal Generators

The manner in which the various drum timing signals are generated will now be described. Referring to FIGS. 3c and 3d, the generation of a home pulse H is effected by way of the read head 110 in which a voltage signal is developed in response to the passage thereunder of a magnetized spot recorded on the home track. This home signal is capacitively fed into a voltage amplifier generally identified at 112 comprised of two triode sections 113 and 114 connected together in the manner shown to provide an amplified voltage output which is capacitively coupled, by way of line 115, to grid 116 of a shaper generally identified as 117. The output from the latter is capacitively coupled, by way of line 118, to grid 119 of a second shaper generally identified as 109. The latter is comprised of triode sections 102 and 103 coupled in the manner shown, the section 103 being utilized as a cathode follower to provide an output along line 104. The output that appears on the line 104 represents the home pulse H and is utilized throughout the circuit diagrams 3a through 3g in a manner to be explained.

Voltage amplifiers and shapers similar to those described and contained in box 111, of FIGS. 1 and 3c, are also found in the rectangular boxes identified as 131, 121, 141 and 53, seen in FIGS. 1 and 3e. In each of these boxes the components are connected in the manner described to provide amplified and shaped signals identified as $C_2$, $C_1$, A and TLU (table lookup). Input signals to these boxes are applied by way of the read heads 130, 120, 140 and 52, respectively. The timings for these signals are shown in the time chart of FIG. 8.

The A track of the drum contains 336 equally spaced recorded bits, the home track, $C_1$ and $C_2$, have each 24 equally spaced bits. The drum is driven at approximately 1800 r.p.m. by appropriate drive means, not shown. The basic frequency rate is 100 kc. The $C_2$, $C_1$ shaped outputs are issued along lines 142, 132, respectively. In FIG. 3e the shaped A pulses are issued along line 122. The shaped output character bit signals from the table lookup box 53 are issued along line 54 which is connected, by means to be described, to an output line 50.

The generation of gates referred to in FIG. 8 as B gate, Inverted B gate and B' gate is accomplished as follows.

Referring to FIG. 3f, the delay unit 170' includes a topped inductor generally referenced as 180 which has an overall delay of six microseconds. The input to this inductor 180 is fed by A pulses delivered along a line 181 connected to the output of a cathode follower 182, seen in FIG. 3e, controlled by A pulses fed to the input of said cathode follower 182. Returning to the input of inductor 180, in FIG. 3f, B' gates are developed as follows. The A pulses supplied to the input of inductor 180 are delayed six microseconds at the time they arrive at the output. These output signals are issued along line 184 and pass through a cathode follower 185 whose output is capacitively coupled to grid 186 of a shaper generally identified as 187. The shaped output from the latter is issued along line 188, through a cathode follower 189 to a line 190 called the B' gate line. The B gates are developed as follows.

Returning to the inductor 180 the A signals applied to the input of the inductor are delayed three microseconds when they arrive at the center tap. From the latter a line 192 is connected to pass the delay signals through a cathode follower 193, through a line 194 which is capacitively coupled to grid 195 of an inverter 196 forming the left section of a dual triode generally identified as 197, the right section 200 thereof serving as a cathode follower. A multivibrator 199 applies signals along a line 198 connected in the manner shown to the plate of inverter 196 and also to the grid of the cathode follower 200. The output from unit 197 is issued from the cathode 201 thereof and is applied along line 202.

Inverted B gates are developed as follows.

The B gates issued along the line 202 pass on to a branch line 205, through an inverter 206, a cathode follower 207 to a line 208 which line is known as the inverted B gate line supplying inverted B gates.

*Three Step Program*

The three step program is basically a three stage ring employed to provide program signals, previously mentioned, for controlling and coordinating the various activities of the invention. Referring to FIG. 3d, the program means generally identified 170 includes, among other components, a trigger 210, a bistable means 214 an AND circuit 218, an inverter 219 and three latch stages, 220, 230 and 240 representing stages 1, 2 and 3, respectively, of the ring. Each stage comprises a latch constituted of a pair of inverters wired in series, a cathode follower and appropriate latchback circuits to maintain the latch in a stable position once it has been set to a given position. The timings for the three stages are shown in FIG. 7.

Operation of the ring is as follows. On each machine cycle a cam contact CB 156, in FIG. 3d, makes at approximately 210° to issue a positive gate along line 171, through a branch line 172, to grid 173' of the left triode of the trigger 210. The effect of this is to provide a negative pulse on lines 174 and 175 connected to the left grid 176 of means 214. The latter issues a positive output along line 177 through cathode follower 178, line 179 connected to one input of the AND circuit 218. The other input to this AND circuit 218 is fed by the line previously identified as column 17 and which line is controlled by the scan matrix to be described. This column 17 line becomes effective whenever column 17 of the record card is being sensed as the latter passes through the collator, thereby supplying a positive gate signal to the AND circuit.

Upon coincidence of these positive gates to the respective inputs of the AND circuit 218, a positive output is issued to the inverter 219 causing the latter to conduct and issue a negative signal on output line 219', which is connected to the latch 220, stage 1, of the program. A positive signal in response to the on condition of the latch 220 is issued along line 221 connected to the plate 173a of a diode contained in diode unit 173. The diode in question conducts to permit a positive pulse to pass through line 222 to condition means 214. The latch 220 will stay on until turned off by a home pulse H under control of the CB 156. The H pulse is issued along the line 104 connected to one input of AND circuit 105, the other input being connected to line 171 over which a positive gate signal is issued under control of the cam contact CB 156. Upon coincidence of these positive gate signals at the inputs to the AND circuit a positive signal is issued on the output thereof to line 106 connected to grid 107 of cathode follower 108. The latter issues a positive signal on line 108' connected to the plates c, e and g of associated diodes contained in the unit 173. Cathode connection d of unit 173 passes the signal through line 223 to turn off latch 220, stage 1. The turning off of the latch 220 causes latch 230, stage 2, to turn on by way of a signal issued along interstage coupling line 224. The latch 230 stays on until turned off by way of the next H pulse which passes through the line 108', diode connections e and f, of unit 173, and line 225. When latch 230 goes off, latch 240, stage 3, goes on by way of a signal issued through interstage coupling line 226. Latch 240 stays on until turned off by way of the next succeeding H pulse issued through diode connections g and h, of unit 173, and line 227. Program 2 signal is issued on output line 228 and program 3 signal is issued on output line 229. When cam contacts CB 156 open, the program is restored to its normal condition.

The B' gate signal developed on the line 190, in the manner earlier described, is combined with program 2 and program 3 signals by means of appropriate AND circuits 232 and 234, respectively. The outputs from these AND circuits are passed through associated cathode followers 233 and 235 from which emerge B' program 2 signal and B' program 3 signal, the former being issued on line 236 and the latter on line 237.

*Scan Matrix*

As previously mentioned the data carried by the record cards fed through the secondary and primary sensing stations, are sensed by the appropriate groups of sensing brushes 3 and 4 and thereupon converted to binary coded data before being recorded on the appropriate tracks of the drum. This sensed information passes through the scan matrix controlled by a 24 position latch ring which is initiated into operation by a home pulse H and advanced step by step under the control of $C_1$ pulses. The outputs from the scan matrix pass through the translator to be described to provide the data in coded binary form.

Referring to FIGS. 3a, 3b, 3c and 3d, the scan matrix is adapted to scan 24 columns of each of the records being sensed by the sensing stations of the collator. Referring specifically to FIGS. 3a and 3c, the scan matrix includes 24 inverters of which only four are shown, namely, 250, 251, 272 and 273. These are wired with the plates of each connected to a common output line 274. The cathodes are wired each to individual ones of the sensing brushes. For example, the cathode of inverter 250 is connected to a socket 275, in turn connected, by way of plug wire 276, to brush socket 277, in turn connected to the brush 3. The remaining inverters 251 through 273 have their associated cathodes wired each in the same manner to individual associated brushes 3. As further seen in FIG. 3a, inverters 300, 301, 322 and 323 are associated with the primary contact roll 10. Here there are 24 inverters used of which only four are shown. These inverters are connected in the same manner as explained above but to the primary brushes 4. The plates of the primary inverters 300–323 are connected to common output line 324. Corresponding inverters of each unit have their respective grids connected to a common line each of which is controlled by an appropriate one of the 24 stages of the latch ring. These stages are all alike and a brief description of one will suffice for the others. Stage 1, for example, is shown in FIGS. 3c and 3a. In FIG. 3c, the latch of stage 1 is enclosed in a box 330, the output from which is fed by way of line 360, through cathode follower 361 forming a part of the latch 330, to output line 384' in turn connected to the respective grids of the inverters 250 and 300.

Of the 24 stages constituting the ring, only stages 1, 2, 17, 23 and 24 are shown in FIG. 3c. The latches shown are 330, 331, 346, 352 and 353. This latch is of the well-known type having a pair of inverters connected in the manner shown and housed in the box 330. Each is further provided with an appropriate latch back path. The latch ring is of course provided with interstage coupling lines, for example, line 386 serving as the intercoupling between stages 1 and 2. In operation, when a stage is turned from on to off, it causes the next succeeding stage to go on, this being accomplished by way of means including the intercoupling lines. The operation of the latch ring is initiated by turning on stage 1 under control of a home pulse H transmitted to the grid of inverter 387, seen in FIG. 3c, through the output line 388 thereof and then to the input to stage 1, latch 330. The stage 1 is turned off upon the application of a $C_1$ signal applied to stage 1, latch 330 as follows.

The $C_1$ output line 132', FIG. 3c, transmits the signal to the grid of cathode follower 391 through output line 392 thereof connected to diode units D1 through D6. Each of said diode units contains four individual diodes the plates of which are connected in common while the cathodes are individually connected to the turn off inputs associated with each of the stages 1 through 24. Since there are 24 spaced $C_1$ signals issued during each drum revolution, the ring will complete a complete cycle of operation to thus provide 24 latch gates to scan 24 columns of each record card in one drum revolution. In accordance with the 12 index positions extending across the width of the record cards in use, at least 12 such full operations will be required to scan all of the 24 columns of data contained on each record card.

The secondary outputs from the scan matrix are fed along the line 274 while the scan primary outputs are fed along line 324. This scanned data from each unit is represented by a serial train of data signals transmitted on the lines just mentioned which signal trains will be modified or translated before being applied to the appropriate read heads 23 and 16 for recording this translated data on the appropriate secondary and primary tracks on the drum. Before explaining how this is accomplished it might be well at this point to explain the structure and operation of the translator.

*Translator*

The translator 150 is shown in part in FIGS. 3b and 3d. Basically, the translator comprises a seven stage ring adapted to provide gate signals SP (Space) 1, 2, 4, 8, 0 and X. These gates with the exception of the space gate are used during program 2 to translate the sensed Hollerith coded characters into binary bit representations representing the characters shown in FIG. 4 and during program 3 for timing purposes. In FIG. 3d there are shown seven latches 400 through 406 represented in block form, each latch being similar to the latch 300 previously explained. Cathode followers 400a through 406a are shown in FIG. 3b connected to the latches 400 through 406. The latches are interconnected by lines 410 through 415 in the manner shown. In operation the first stage latch 400 is turned on under control of the $C_1$ signal issued through line 132, shown in FIG. 3c, upper diode in diode unit 422, line 423, grid 424 of inverter 425. The latter issues an inverted signal on line 426 connected to the latch 400 to turn the latter on. The operation of the ring is initiated under control of a $C_1$ signal and advanced sequentially under control of A pulses transmitted by way of the line 122 connected to diodes contained in diode units D8 and D9. These A signals are then passed on through lines 430 through 436 connected in the manner shown to the turn off inputs to the latches 400 through 406. Outputs from the stages 1 through 7 are issued along output lines 440 through 446 controlled by associated cathode followers 450 through 456. These cathode followers, except cathode follower 450, have their respective cathodes controlled in the manner shown by machine timed cam contacts CB 150 through CB 155 having the timings indicated in the chart of FIG. 6. The output lines 441 through 446 in turn are connected to a common translator output line 457 over which are transmitted a train of spaced timed gate signals 1, 2, 4, 8, 0, X. These signals are combined with the scanned data signals during program 2 by appropriate means to be described to produce the binary coded representations of the scanned data. The gate signals 1, 2, 4, 8, 0, X are supplied to AND devices, in FIG. 3g, by way of lines, not shown, connected to terminals seen at the lower righthand side of the translator in FIG. 3b. The translator is also operated under control of $C_1$ and $C_2$ signals during table lookup operations for timing purposes by the following means. In FIG. 3c, $C_2$ signals pass through line 142, upper diode of diode unit 420 which functions as an AND circuit. The lower diode of this unit 420 is connected to line 229 which is effective during program 3. The output of the unit 420 passes over line 421 through the lower diode in unit 422 and then through line 423, inverter 425, line 426 to stage 1, in FIG. 3d.

The means for combining the binary translator outputs with scanned secondary data includes a coincidence unit 460, responsive to negative going signals, containing cathode followers 461 and 462. It is seen in FIG. 3b that the secondary scan output line 274 is connected to grid 463 of the cathode follower 461, and that the translator output line 457 is connected to grid 464 of cathode follower 462. When coincidence of signals is achieved on both grids, an output is issued on line 465 connected to grid 466 of cathode follower 467 forming part of coincidence unit 469 which operates like the coincidence unit 460. The right section 468 thereof has its grid 470 connected to the line 202 over which B gate signals are transmitted. Upon coincidence of a B gate and an output on the line 465 an output is issued, from unit 469, on line 471 connected to cathode 472 of inverter 473. The output from the latter is issued on line 474, capacitively coupled to grid 475 of cathode follower 476. The output from the latter is issued on line 477 through contacts of relay R100a normally closed contacts and through the secondary write head coil 23. Relay R100 is energized by pluggable connections, not shown, when it is desirable to energize the write head for erase operations. The secondary erase circuit follows a path through the head coil 23, contacts R100a transferred, line 478 through CB 165 cam contacts.

Writing on the primary track by way of head 16 is accomplished in much the same manner by appropriate means used in the manner explained above. Referring to FIG. 3b, coincidence device 480, similar to 460 provides an output through line 481 connected to another coincidence device 482, similar to 469, from which an output passes through line 483 through inverter 484, output line 485, through cathode follower 486, line 487, relay R101a contacts normally closed and through the head 16. Relay R101 is controlled by pluggable means, not shown, to cause erasure of data on the primary track. The primary erasure control circuit passes through the head 16, relay 101a contacts transferred, line 488 and through cam contacts CB 165.

The circuitry just described is illustrative of one of 24 similar circuits employed for effecting the recording of 24 columns of scanned translated data on respective secondary and primary tracks of the drum. Now to be considered is the manner in which this recorded data is read from the secondary and primary tracks to a comparing device which is capable of issuing a given signal level representing an equal comparison, or a different signal level representing an unequal comparison.

Secondary coded data recorded on the secondary track is read therefrom through the read head 23', seen in FIG. 3f, connected to Secondary Read means 30 containing shapers and an amplifier similar to those contained in the box 111 seen in FIG. 3c. The output from means 30 passes through output line 29 to inverter 36'. The latter issues an inverted output that turns on the latch unit 37. The latter passes positive output gates through the line 41, through branch line 37' connected to the comparing unit 31 shown in block form in FIG. 3g.

Primary coded data recorded on the primary track is read therefrom through read head 16', seen in FIG. 3f, through Primary Read means 40 which is similar to the means in 111, through output line 28 to the inverter 36. From the latter, the inverted output is applied over line 36f to turn on the latch 38 which in turn provides a positive gated output on the line 42 that connects to a branch line 38', seen in FIG. 3g, in turn connected to the left input of the comparing unit 31.

During the course of comparison the comparing unit 31 issues either an up level or down level on the line 32 connected to the associated comparing means 33. This means contains an inverter 56, the cathode follower 57 connected to one input of an AND circuit 58 having a second input connected to the B' program 2 signal, line 236, a cathode follower 59, diode 60, cathode follower 64 whose output is connected to one input of an AND circuit 65, further having a space signal SP applied to the other input thereof. The output from the AND circuit 65 is fed by way of output line 66 to the grid of unequal thyratron TH generally designated 67. When the comparing unit 31 ascertains that an unequal comparison exists during program 2 time, the thyratron 67 will be fired. However, an equal condition occurring during program 2 time prevents thyratron 67 from firing. The output of thyratron 67 is connected to the line 68 in turn connected to the grids of the inverter 36 and 36' seen in FIG. 3f. On an unequal comparison and with thyratron 67 fired in consequence thereof, the line 68 will be down to apply a cutoff bias to the inverters 36 and 36', thus rendering the inverters unresponsive to the signals applied by way of the lines 28 and 29. Capacitor 60' has a time constant of such magnitude as to provide sufficient charge during the succeeding SP interval to supply a positive signal to the input of the AND circuit 65 when an unequal signal is developed as early as 1 bit time.

The line 68 at the top of FIG. 3g is connected to branch line 73 connected to one input of AND circuit 74 contained in the box generally identified 73a in FIG. 1. The other input to said AND circuit 74 is fed by line 229 over which program 3 signal Prog. 3 is issued. The output from the AND circuit 74 is fed through a cathode follower 75, through line 76, to the control grid of equal thyratron 77, the plate circuit of which includes a relay 78 controlled by cam contacts CB 163. This relay is provided with contacts, not shown, connected to the sockets 92, 91, in FIG. 1, for supplying an equal signal to the feed and distribution control 100.

To insure that one and only one thyratron is fired during any one comparing operation, an interlock is provided which consists of a line 690 grounded through a resistor 690', shown in the lower righthand corner of FIG. 3e. The line 690 connects together the three cathodes of thyratrons 673, 683 and 77. In operation, the firing of any one thyratron in response to a signal applied to the grid of that thyratron causes the voltage level on the line 690 to rise above ground to a value above the ionization potential of the remaining unfired thyratrons; thus, any signals applied thereafter to the grids of the unfired thyratrons are ineffective to initiate ionization.

In FIG. 3g, it will be further seen that lines 41 and 42 are connected to cathode followers 84 and 85, respectively. Outputs from the latter are connected, respectively, to lines 86 and 87, in turn wired to the character storage units 43 and 44. By means of the above, the secondary and primary recorded data is also serially applied to the units 43 and 44. Each unit is provided with capacitor storage elements and associated means for regeneration of the data trapped or held in said storage means.

*Character Storage And Table Lookup Comparison*

The Primary Character Storage Unit 44 comprises six storage capacitors 501 through 506, FIG. 3g, one side of each being connected to the common line 87 while the opposite sides of said capacitors are connected in the manner shown to diode elements contained in diode units D10, D11 and D12. For example, capacitor 501 is connected in the manner shown to cathode and plate connections, respectively, a and c of unit D10. These capacitors 501 through 506 are utilized to store binary coded primary character data.

Secondary Character Storage Unit 43 includes capacitor elements 511 through 516, one side of each capacitor being connected to common line 86 while the opposite sides of the capacitors are connected in the manner shown to diode elements contained in diode units D20, D21, D22. For example, the capacitor 511 is connected in the manner shown to cathode and plate connections, respectively, a and c of unit D20.

It is further seen that diode elements b, d, f and h of diode unit D10 are connected to corresponding elements in diode unit D20 by way of common connecting lines 521 through 524. Similarly, the diode elements in diode unit D11 are connected to corresponding elements in diode unit D21 by way of common connecting lines 525 through 528. Lines 529 through 532 connect corresponding diode elements in diode units D12 and D22.

The odd numbered lines 521 through 531 are connected in turn to odd numbered lines 541 through 551, while the even numbered lines 522 through 532 are connected to even numbered lines 540 through 550. The even numbered lines 540 through 550 are connected to the outputs of inverters 553 to 558, employed as read-in devices, whose inputs are connected to appropriate ones of lines 560 through 565 connecting, respectively, the outputs of AND circuits 566 through 571 to cathode followers 572 through 577 which operate as readout devices for the capacitor storage elements. The AND circuit devices 566 through 571 have each an input fed by the line 208 which transmits the inverted B gate signal, and a second input of each end device being fed in the manner shown by respective ones of the translator binary gate signals 1, 2, 4, 8, 0 and X. By means of this circuitry, capacitor storage elements 501 through 506 in the character storage unit 44, and capacitor storage elements 511 through 516 in character storage unit 43 are sequentially controlled in accordance with the timing of gates 1, 2, 4, 8, 0, X for storing and regenerating one binary character at a time, one from the primary unit and one from the secondary unit.

As utilized herein, a charge on the capacitor represents a zero while the absence of the charge represents a 1. When character gate signals representing an individual character are applied upon the line 87, a positive signal for each bit of the code 1, 2, 4, 8, 0, X is applied to appropriate ones of the six capacitor storage elements 501 through 506. For example, a "1" bit gate signal, which is positive, is applied by way of line 87 to capacitor 501. Concurrently, a B gate signal, which is negative is applied to the diode plate element $b$ of diode D10, while an inverted B gate signal is applied to the diode cathode element $d$. Under these conditions, no conduction is possible through the diode elements in question in the diode unit D10. Therefore, the capacitor 501 remains uncharged to represent the presence of a character bit.

In the absence of a character gate signal, a negative signal level is applied by way of line 87 to the capacitor 501. Under this condition and while diode cathode element $a$ is negative with respect to diode plate element $b$ of diode D10, conduction follows to charge the capacitor 501, the presence of a charge in this instance representing the absence of a binary bit.

Now in the event that an unequal comparing condition is recognized by the comparing unit 31, the thyratron 67 is fired to lower the voltage level on the line 68, the effect of which prevents further entry of data into the character storage units 43 and 44 and initiates regeneration of the characters held in units 43 and 44.

For the specific operations of capacitor storage regeneration, reference is invited to Patent No. 2,959,351 issued November 8, 1960, to Hamilton et al. and assigned to the common assignee.

The further entry of data into the units 43, 44 is prevented, as a consequence of an unequal comparison, by changing the bias on the grids of the respective inverters 36' and 36. The change in bias follows in response to the voltage drop on the plate of the conducting thyratron 67, shown at the top of FIG. 3g, which drop is transmitted over the line 68 connected to said inverters.

Regeneration of a stored character will now be described. Referring to FIG. 3g, it is seen that the primary output line 87 has connected thereto, a branch line 600 connected to inverter 601. The output from the latter is fed through line 602 to the right grid of a cathode follower contained in a coincidence unit 603 which unit is similar to the structure shown in box 616 which functions as a coincidence device. The left side of box 603 is fed by means of a connection to line 68. The output from unit 603 is passed on to line 604 connected to a diode unit 605, through line 606 to the turn on input terminal of the latch 38. The line 604 provides a down level signal whenever a down level signal appears on the line 68 as a result of an unequal comparing condition effected by the comparing unit 31. The negative signal on line 606 turns on the latch 38 which accordingly issues a positive output on the line 42. The latter is connected to the capacitor storage line 87 in the manner described. The regenerated signals are under control of the capacitor read-in and readout means described to enable positive or negative signal levels to pass over the regenerating means described depending upon the presence or absence of charges on the capacitor elements 501 through 506.

Regeneration of a stored character in the character storage unit 44 is effected concurrently with the regeneration of the primary character as described above. The means associated with the regeneration of the secondary character includes the line 86 connected to the grid of inverter 610 whose output passes over line 611 connected to a coincidence device 616, which connection is specifically made to the right grid 612 of the right hand cathode follower generally identified as 613. The left cathode follower generally identified 614 has its grid 615 connected to the line 68. The cathode followers 613 and 614 function as a coincidence device. The output from the coincidence device 616 is connected to output line 617, through diode generally identified 618, seen in FIG. 3f, from which a connection extends to the turn on terminal of the latch 37.

The regenerated character signals issued through the respective primary and secondary output lines are compared with the character signals issued by table lookup means. The comparison is effected during program 3 within the comparing units 46, 47 and 46', 47' under control of means now to be described.

Referring to FIG. 3e the table lookup signals are generated under control of the read head 52 which passes voltage signals according to the character bit signals read. These signals pass through the box 53 containing components adapted to amplify and shape the character signals which are then issued along the output line 54 to the grid of an inverter 55 whose output is fed to another inverter 55a. The output from the latter is fed through a cathode follower 55b to the line 50 to which the branch lines 48 and 49 are connected to issue the table lookup character signals to the left side of comparing units 46 and 47, respectively. The right side entries to these comparing units are connected to the lines 37' and 38', respectively, over which the regenerated character signals are issued under control of the storage units 44 and 43.

The secondary character signals and the table lookup character signals are compared in the comparing unit 46 and a positive output is issued along the output line 61 when there is agreement in these signals, or a negative output is issued when there is disagreement in these signals. Concurrently, the primary character signals and the same table lookup character signals are compared in comparing unit 47 which provides an output on line 62 having the same significance as that issued by line 61. These output levels are further conditioned and fed into a high low comparing device which includes a pair of capacitor storage elements 46' and 47'.

These capacitor storage elements 46' and 47' are adapted to issue a low secondary signal and a low primary signal in the manner to be explained. The primary output signals on line 62 controlled by comparing unit 47 are fed through inverter 620, cathode follower 621, output line 622, connected to one input of an AND circuit 624 having a second input connected to the B' program 3, line 237. The output from the AND circuit 624 passes through line 625, inverter 626 to line 627, cathode follower 628, line 629 to cathode element 630a of diode unit generally identified 630. In this diode unit, elements $a$, $b$, $e$ and $f$, function as an AND circuit. The cathode element $e$ is effective during program 3 under control of line 637 connected to the output of cathode follower 636 whose input is fed by line 635 forming the output of double inverter 634 controlled by the program 3, line 229. Thus with a coincidence of signals on cathodes 630a and 630e, an output is applied on line 631 feeding the capacitor 47'.

The capacitor 46' is controlled by similar means beginning with the secondary comparing unit output line 61. The means includes inverter 640, cathode follower 641, output line 642 connected to one input of AND circuit 643 having a second input connected to the line 237 over which the B' program 3 signal is applied. The output from AND circuit 643 passes through inverter 644 through cathode follower 645 to output line 646 connected to cathode 647a of diode unit generally identified as 647. Here as in diode unit 630, diode elements $a$ and $b$, $e$ and $f$, function as a coincidence device. The cathode element $e$ is connected to line 637 over which the program 3 signal is passed. When coincidence of signals is achieved on cathode 647a and cathode 647e, an output is applied on line 648 to the capacitor 46'.

A restoring gate signal is applied to both capacitors 46' and 47' in a manner to be explained. A restoring gate is developed by combining a "1" gate signal with an inverted B gate signal by means of AND circuit 650 seen in FIG. 3f. The "1" gate signal is applied to one input of the AND circuit 650 by way of line 649. The inverted B gate signal is applied to the other input of the AND circuit 650 by way of output line 653 of a cathode follower generally identified 651 whose input is connected to line 652 in turn connected to the B gate line 202. The output of the AND circuit 650 passes through cathode follower 654 to the output line 655 which conveys the restore signal to the plate 647d of diode unit 647 and also the plate 630d of diode unit 630 seen in FIG. 3e. The restoring gate thus provides the capacitors with a restored level in preparation for their operations.

The associated c cathodes of these units are respectively connected, by way of lines 666 and 667, to the capacitors 46' and 47', respectively. The right side of each of the capacitors have a common connection to the space gate line 440. The capacitor 46' is further provided with an output line 670 connected through cathode follower 671 to the control grid 672 of thyratron 673 having a low secondary control relay 674 wired in the plate circuit which is further controlled by cam contacts CB 164.

In like manner, capacitor 47' is further provided with an output line 680 connected through cathode follower 681 whose output is connected to grid 682 of thyratron 683 having a low primary control relay 684 in its plate circuit which is also controlled by the cam contacts CB 164.

Since one or the other of the two output lines 648, 631 will have a positive output level while the other has a negative output level, the charges on the capacitors 46', 47' will be accordingly different in response to these output levels. When the SP gate is applied to both capacitors, the resultant charges will be different, the capacitor having the greater charge yields a voltage sufficient to overcome the bias on its associated thyratron, thus causing the latter to conduct.

*Comparing Unit*

The details of one of the comparing units 46, 47 employed in the practice of the invention is shown in FIG. 9. The unit comprises essentially a double triode having a left section 700 and a right section 701. Both sections include a plate, grid and cathode elements, respectively identified a, b, c. The plates are connected in common to a load resistor 702 in turn connected to a +150 volt supply. The left grid b is connected to a grid limiting resistor 703 in turn connected to a point 704 contained in a circuit comprised of resistors 705 and 706. This circuit is connected with one end to a —250 volts supply and the other end to right cathode c. In like manner, the right grid b is connected to a grid limiting resistor 708 in turn connected to a point 709 contained in a circuit including resistors 710 and 711. This circuit is connected with one end to a —250 volts supply and the other end to left cathode c. Inputs to the circuit configuration are made at terminals 713 and 714. The output from the comparing device is issued at an output line 715 which corresponds to output line 61 of the unit 46 in FIG. 3e. Values of resistance used in this circuit may be varied in accordance with the response condition required and the particular voltage signals being used. The particular embodiment shown in FIG. 9 employs the following values: resistor 702, 75K; resistors 703 and 708, each 10K; resistors 705 and 710, each 560K; resistors 706 and 711, each 51K. The signals to be compared are applied to terminals 713 and 714, which signals have a 50 volts excursion, the positive level being approximately +10 volts and the negative level being approximately —40 volts.

In operation, assuming positive signal levels are applied to both input terminals 713 and 714, the grids will be driven to approximately —12 volts cutoff value with the result that a positive output will be issued along output line 715. When negative signal levels are applied to both inputs 713 and 714, the grids will be driven to approximately —55 volts cutoff value with the result that a positive output will be issued on the output line 715. When a positive level and a negative level, respectively, are applied to the terminals 713 and 714, respectively, the left grid will be at —55 volts and the right grid at —12 volts. Since the right cathode is now at —40 volts, the right triode section conducts with the result that a negative output is issued along the output line 715. Conversely, when a negative level and a positive level, respectively, are applied to the terminals 713 and 714, respectively, the right grid will be at —55 volts and the left grid at —12 volts. Since the left cathode is now at —40 volts, the left triode section conducts to thereby issue a negative output on the output line 715.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a comparing system for comparing signal representations of character data the combination comprising a first comparing means for issuing an unequal signal in response to a comparison of unlike character signal representations of the character data being compared; a pair of storage means responsive to the unequal signal for storing the character signals being compared by said comparing means; a table of characters comprising a full complement of the characters of a desired system and arranged according to a desired sequence to issue character signals; and second and third comparing units operable, following an unequal comparison, to compare each of the stored character signals with the issued table character signals and to provide an output signal by the comparing unit yielding an equal comparison.

2. In a comparing system for comparing signal representations of character data the combination comprising a first comparing means for issuing an unequal signal in response to a comparison of unlike character signal representations of the character data being compared; a pair of storage means responsive to the unequal signal for storing the character signals being compared by said comparing means; a table of characters comprising a full complement of the characters of a desired system and arranged according to an ascending sequence to issue character signals accordingly; and second and third comparing units operable, following an unequal comparison, to compare each of the stored character signals with the table character signals, and upon determination by either the second unit or the third unit that an equality exists during the table comparing, to issue an output signal by the unit making such determination, said output signal signifying that the associated stored character is low with respect to the other stored character.

3. In a comparing system for comparing signal representations of character data the combination comprising a first comparing means for issuing an unequal signal in response to a comparison of unlike character signal representations of the character data being compared; a pair of storage means responsive to the unequal signal for storing the character signals being compared by said comparing means; a table of characters comprising a full complement of the characters of a desired system and arranged according to a descending sequence to issue character signals accordingly; and second and third comparing units operable following an unequal comparison to compare each of the stored character signals with the table character signals, and, upon determination by either the second unit or the third unit that an equality exists during the table comparing, to issue an output signal by the unit making such determination, said output signal signifying that the associated stored character is high with respect to the other stored character.

4. In a collating machine for merging two sets of records bearing classification character data the combination comprising separate feeding means for each of the sets of records to feed the records along separate converging paths; a merging device disposed at the convergence of said paths; a plurality of record receiving pockets controlled by said merging device to direct cards having common classification character data into one pocket while those not having common data are directed into the other pockets; appropriate sensing means for sensing the records for the classification character data; a magnetic storage means having appropriate storage means for storing the sensed classification character data derived from each of a pair of sensed records, and including a stored cable comprised of a full complement of characters, alphabetic, numeric and special, and arranged according to an ascending sequence; a first comparing means for comparing the stored sensed classification character data corresponding to the data borne by the appropriate pair of sensed records and providing an unequal signal upon a determination by said comparing means that the stored sensed data is unequal; a data storage means having appropriate means operable in response to an unequal signal to hold the sensed stored data determined to be unequal; second and third data comparing units operable following an unequal determination to compare each of the held data with the characters of the table and, upon determination by either of said units that an equality exists, to issue a comparing signal by the unit providing the equal determination, said comparing signal signifying that the associated stored character data is low with respect to the other stored character data; and appropriate means responsive to the comparing signals to control said merging device to direct the compared sets of records to appropriate ones of said pockets.

5. In a collating machine for merging two sets of records bearing classification character data the combination comprising separate feeding means for each of the sets of records to feed the record along separate converging paths; a merging device disposed at the convergence of said paths; a plurality of record receiving pockets controlled by said merging device to direct cards having common classification character data into one pocket while those not having common data are directed into the other pockets; appropriate sensing means for sensing the records for the classification character data; a magnetic storage means having appropriate storage means for storing the sensed classification character data derived from each of a pair of sensed records, and including a stored table comprised of a full complement of characters, alphabetic, numeric and special, and arranged according to a descending sequence; a first comparing means for comparing the stored sensed classification character data corresponding to the data borne by the appropriate pair of sensed records and providing an unequal signal upon a determination by said comparing means that the stored sensed data is unequal; a data storage means having appropriate means operable in response to an unequal signal to hold the sensed stored data determined to be unequal; second and third data comparing units operable following an unequal determination to compare each of the held data with the characters of the table and, upon determination by either of said units that an equality exists, to issue a comparing signal by the unit providing the equal determination, said comparing signal signifying that the associated stored data is high with respect to the other stored data; and appropriate means responsive to the comparing signals to control said merging device to direct the compared sensed records to appropriate ones of said pockets.

6. In a collating machine for collating records bearing classification data; a pair of record feeding devices having appropriate channels along which the records are fed, which channels converge and connect with a common channel leading to a plurality of record receiving pockets; record distribution means disposed at the convergence of said channels and adapted to control the destination of the records to appropriate ones of the pockets; record sensing means disposed in said channels for sensing the records for the classification data; a magnetic storage device having appropriate storage facilities for storing and reading out the sensed data, and having a stored table of characters with readout means therefor, which characters are arranged in ascending sequence; a first comparing device for comparing the stored data read out from said magnetic storage device and providing appropriate signals, equal and unequal, in accordance with the comparison made by said first comparing device; second data storage means operable in response to an unequal signal to hold the read out data determined to be unequal; second and third comparing units operable in response to an unequal signal to compare each of held data with the characters of the stored table, and, upon determination by either of said units that an equality exists, to issue a comparing signal in response to the equal comparison by the unit so operative and signifying that the associated held data is low with respect to the other held data; and means connecting the feeding devices and distribution means and operable in response to the equal or low signals to cause the sensed records in question to be directed into appropriate pockets.

7. In a collating machine for collating records bearing classification data; a pair of record feeding devices having appropriate channels along which the records are fed, which channels converge and connect with a common channel leading to a plurality of record receiving pockets; record distribution means disposed at the convergence of said channels and adapted to control the destination of the records to appropriate ones of the pockets; record sensing means disposed in said channels for sensing the records for the classification data; a magnetic storage device having appropriate storage facilities for storing and reading out the sensed data, and having a stored table of characters with readout means therefor, which characters are arranged in descending sequence; a first comparing device for comparing the stored data read out from said magnetic storage device and providing appropriate signals, equal and unequal, in accordance with the comparison made by said first comparing device; second data storage means operable in response to an unequal signal to hold the readout data determined to be unequal; second and third comparing units operable in response to an unequal signal to compare each of held data with the characters of the stored table, and, upon determination by either of said units that an equality exists, to issue a comparing signal in response to the equal comparison by the unit so operative and signifying that the associated held data is high with respect to the other held data; and means connecting the feeding devices and distribution means and operable in response to the equal or high signals to cause the sensed records in question to be directed into appropriate pockets.

8. In a comparing machine a pair of character signal sources issuing timed signal trains representing coded character designations to be compared; comparing means for comparing the issued signals of one character train against those of the other character train, and providing an unequal signal in response to a difference in the signals constituting the characters being compared; storage means operable in response to an unequal signal to hold the character signals determined to be unequal; a character table comprised of an ascending array of coded characters and adapted to issue a train of coded character signals; a pair of comparing units adapted to compare the held character signals with the table coded signals and having associated means capable of issuing an equal comparing signal whenever an equal determination is made by one or the other of said units, and the unit making such determination being operable thereupon to issue the equal comparing signal, and signifying that the associated held character is low with respect to the other held character.

9. In a machine of the character described, a rotatable magnetizable medium comprising a pair of tracks bearing coded data, a table lookup track bearing a table of characters recorded in the same coded form, a first comparing means for comparing the coded data recorded on said pair of tracks, first comparing ouput means providing an unequal signal in response to an unequal comparison between the data on said pair of tracks, second and third comparing means responsive to said unequal signal for comparing the unequal data with the data in said table lookup track, and means responsive to an equal comparison during the latter comparing operation for providing an equal output signal.

References Cited in the file of this patent

UNITED STATES PATENTS

| | | |
|---|---|---|
| 2,247,316 | Smith | June 24, 1941 |
| 2,602,545 | Luhn | July 8, 1952 |
| 2,610,260 | Moffett | Sept. 9, 1952 |
| 2,614,169 | Cohen | Oct. 14, 1952 |
| 2,745,493 | Furman | May 15, 1956 |
| 2,866,550 | Nelson | Dec. 30, 1958 |
| 2,888,666 | Epstein | May 26, 1959 |
| 2,889,538 | Geisler | June 2, 1959 |